March 3, 1970     T. J. BUITKUS     3,497,979
ANIMATED DISPLAY DEVICE
Filed June 7, 1967
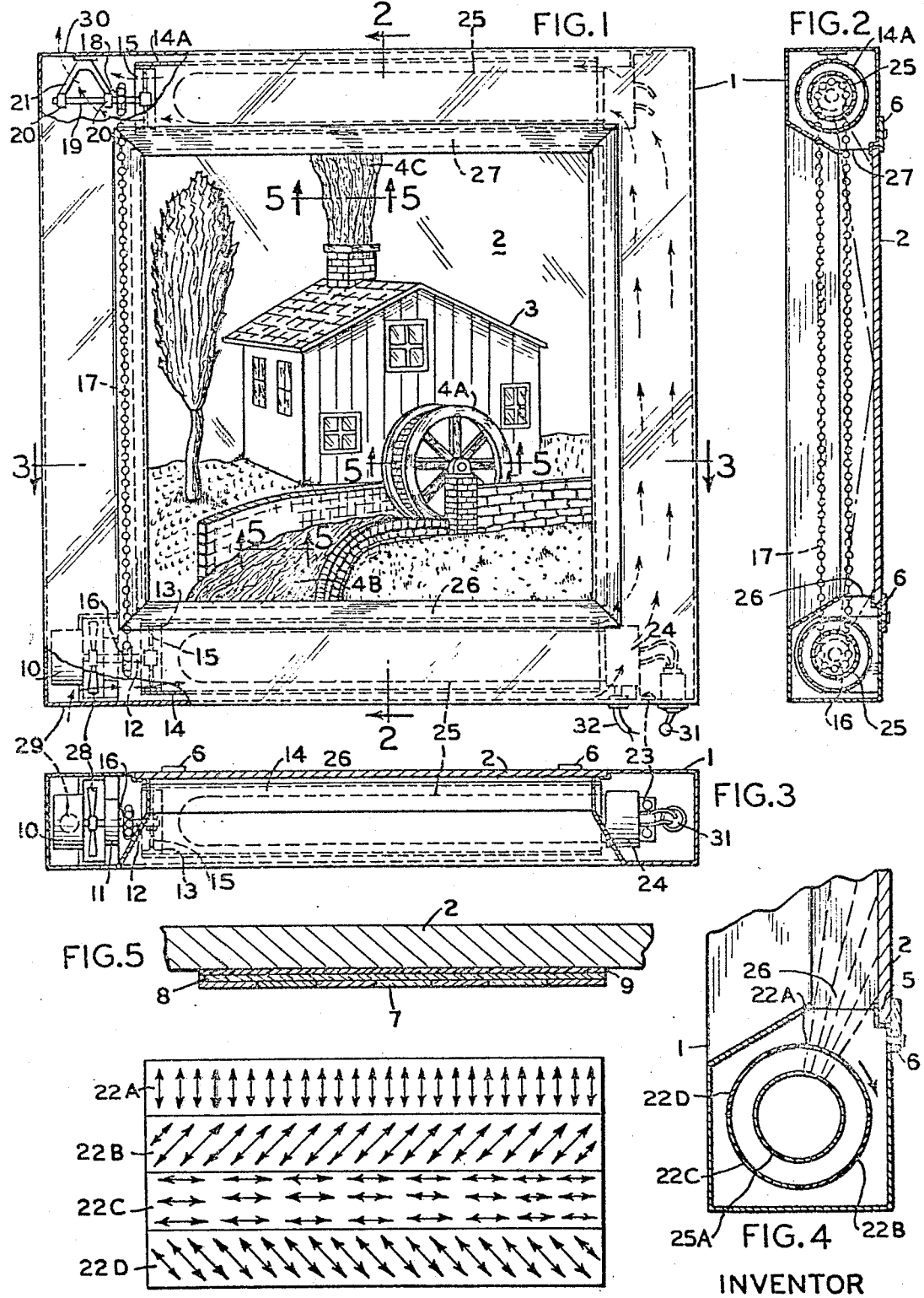
INVENTOR
THOMAS J. BUITKUS 3,497,979
ANIMATED DISPLAY DEVICE
Thomas J. Buitkus, 838 Lenox Ave.,
Waukegan, Ill. 60085
Filed June 7, 1967, Ser. No. 644,340
Int. Cl. G09f 13/36
U.S. Cl. 40—106.53  1 Claim

ABSTRACT OF THE DISCLOSURE

A display device for animating a picture responsive to changes in light polarity by the use of polarized light projected from rotating cylinders housed in a framework and cooled by force ventilation.

---

This invention relates to a method of and means for animating a picture or other graphic illustration. More specifically, it relates to a device for producing the illusion of motion optically in a pictorial representation by means of polarized light.

An object of the present invention is to provide an improved display device embodying the use of polarized light and birefringent material or Vectographs to simulate motion such as the turning of wheels, flowing water, rising smoke, etc. in a realistic manner in a picture or scene provided for that purpose.

Another object of this invention is to provide a compact, self-containing device suitable for use as a training aid to visually display the sequences and modes of operation of various mechanical, pneumatic, and hydraulic systems by simulating motion and the flow of air, fluid, or other media and likewise to demonstrate the principles of various electrical circuits and related components by imparting the illusional semblance of electron flow, magnetic fields and other phenomena to a diagram or schematic representation.

A further object of this invention is to provide a display device of the character described from which the picture panel may be easily removed and replaced with a substitute picture in place of the original one.

This invention resides in the features of construction, combinations of components and arrangement of parts which will be exemplified and described with reference to the accompanying drawing in which:

FIG. 1 is a front elevational plan view, with the picture frame partly cutaway to show the animation mechanism of the device.

FIG. 2 is a transverse sectional view taken along the line 2—2 of FIG. 1.

FIG. 3 is a sectional view taken along the line 3—3 of FIG. 1 looking downwardly.

FIG. 4 is an enlarged sectional view of the bottom portion of FIG. 2.

FIG. 5 is a fragmentary cross-sectional view of the picture panel showing animative element composition comprising birefringent material and light polarizing material on a reflective base.

FIG. 6 is a view of one arrangement of segments of sheet polarizing material shown removed from the cylinder and unbanded, the arrows indicating the relative degrees of angular orientation of polarization of each of the segments.

Referring to FIGURES 1 thru 4 of the drawing, the numeral 1 designates a frame comprising a hollow structure, similar in shape to a conventional picture frame, consisting of side, front, back, top and bottom walls of wood, metal, or other suitable material and is designed to enclose and conceal the mechanism for producing the animation effects. It will be understood that the frame may assume various other shapes and be constructed in any desired manner. A panel 2 having displayed thereon a picture or graphic illustration 3 containing animative elements 4A, 4B and 4C depicting a water wheel, flowing water and rising smoke respectively, is mounted in a recess 5 in the back of frame 1 and is detachably secured in place by any suitable means such as turn fasteners 6. It is preferable that the picture panel be removable in order that it may be readily replaced with another panel depicting different subject matter. Animative elements 4A, 4B and 4C may consist of either combinations of birefringent material 7 and light polarizing material 8 arranged in single or multiple layers on a reflective base 9 (FIG. 5), or of Polaroid Vectograph reflection type prints, or of combinations of both. Said animative elements are designed to exhibit changeable features to the observer when illuminated by polarized light of continually varying polarity as will hereinafter be explained. Vectograph reflection prints are two superposed photographic images visible alternately when illuminated by polarized light having different angles of polarization and are rendered by means of varying degrees of polarization in the Vectograph film. The double images are polarized at right angles to each other so that only one image is seen at a time depending upon the angular orientation of the polarized light and contain a reflective backing to enhance visibility. The picture 3 shown in FIG. 1 is merely an example of a scene amenable to animation and is for the purpose of illustration only, and not of limitation.

Accommodated within the interior of the frame is an electric motor 10 containing reduction gearing 11 to provide a relatively slow output speed for drive shaft 12. Attached to the end of said shaft is a hub 13 secured to one end of a rotatable cylinder 14 constructed of a transparent, isotropic, heat resistant material such as glass. Another hub 13 is likewise secured to a similar rotatable cylinder 14A located in the top section of the frame 1. Hubs 13 are preferably provided with ventilation holes 15. Also attached to shaft 12 is a sprocket wheel 16 which transmits rotary power from motor 10 through a bead chain 17 which extends up through the hollow left side of the frame and engages a sprocket wheel 18 attached to shaft 19 in the top section of the frame. Shaft 19 is journaled in a bearing 20 suitably supported by bracket 21 and serves to rotate cylinder 14A simultaneously with cylinder 14. The foregoing arrangement is an example of a means by which two remote cylinders may be rotated by a single motor, it being understood that additional cylinders (not shown) may also be accommodated in each of the side sections of frame 1 and likewise rotated by a single motor through the expediency of any conventional system of power transmission such as belts, shafts, pulleys, gears, etc. As seen from FIG. 1, the rotatable cylinders 14 and 14A occupy the approximate mid-sections of the bottom and top of the frame and are positioned to register with the picture elements that are to be animated.

Suitably secured or cemented to the periphery of cylinders 14 and 14A are segments of sheet light polarizing material 22A, 22B, 22C and 22D arranged contiguously in a predetermined sequence as shown in FIG. 6. The individual segments may be cut from linear dichroic polarizing material available commercially in thin plastic sheet form. The four segments function together as an endless band of polarizing material which changes the angle of polarization of light in four successive steps or stages through a 360 degree angular orientation. The foregoing is but one example of possible segment arrangement, it being understood that other combinations comprising greater or lesser numbers of segments polarized at various angles and arranged in different sequences may also be employed to obtain special animation effects such as oscillation, pulsation, etc.

Detachable brackets 23 support electric sockets 24 holding tubular lamp bulbs 25 which are positioned to extend axially into the interior of cylinders 14 and 14A. Lamp bulbs 25 are preferably of the type containing integral reflectors 25A. Frame 1 is provided with light emitting slots 26 and 27 of appropriate size which are located in proximity to the periphery of each of the cylinders 14 and 14A. The interior of frame 1 is preferably ventilated by forced convection in order to maintain the components of the animation mechanism within permissible operating temperature limits when the device is operated for extended lengths of time. A fan 28 driven by motor 10 may be employed to draw air in through an intake vent 29 located under the motor and circulate cooling air through hub openings 15 into and over cylinder 14, up through the interior of the right side of the frame into and over cylinder 14A, the heated air being exhausted through outlet vent 30 located in the top of the upper left side of the frame. The electric power to operate the motor and lights may be provided through a conventional electric circuit (not shown) including a switch 31 and line cord 32 for connection to an external power source.

The device operates as follows:

When switch 31 is closed, the lamps 25 are illuminated and motor 10 rotates cylinders 14 and 14A. A beam of light from the lamps is projected by reflectors 25A through segments 22A, 22B, 22C and 22D in repetitive sequence and shines through slots 26 and 27 illuminating animative elements 4A, 4B and 4C of the picture. An observer facing picture 3 will see a series of variegated transformations and changing forms in said elements induced by the continual change in the angle of polarization of the light emanating from the various polarizing sectors on the rotating cylinders. The polarized light projected upwardly through the bottom slot 26 creates the illusion of rotation of the water wheel in element 4A and the illusion of flowing water in element 4B while the polarized light shining downwardly through the upper slot 27 simulates the motion of rising smoke in element 4C.

It is not essential to the operation of this device that the polarizing segments be supported upon a cylinder as they may also be carried upon an endless belt which in effect is a flattened cylinder. In addition to housing the animation apparatus, the frame 1 also serves to shield picture 3 from extraneous light which would otherwise compete with the polarized light and thus detract from the animation effects. In accordance with the overall size and intended usage such as advertising displays, decoration, visual teaching aids, etc., the present device may be either hung upon a wall or set on a stand of appropriate height.

While this invention has been described with particular reference to the construction shown in the drawing and while various changes may be made in the detail construction, it shall be understood that such changes shall be within the scope of the present invention as defined by the appended claim.

What is claimed as new and desired to be protected by Letters Patent is:

1. A display device comprising, in combination, a framework having a hollow bottom portion with an external vent, a hollow top portion with an external vent and a hollow side portion connecting said bottom and top portions, a graphic representation responsive to polarized light supported by said framework, two transparent rotatable cylinders carrying segments of light polarizing material to cooperate with said graphic representation, one of said cylinders being positioned in said top portion and the other cylinder being positioned in said bottom portion, a source of illumination axially situated in each of said cylinders, a power source transmitting rotary motion to said cylinders thereby causing polarized light to be projected through said light polarizing material on said cylinders onto said graphic representation, and a fan for drawing air through said vent in said bottom portion and circulating cooling air over said cylinder in said bottom portion, up through said side portion, over said cylinder in said top portion, and exhausting heated air through said vent in said top portion.

References Cited
UNITED STATES PATENTS

| | | | |
|---|---|---|---|
| 2,295,863 | 9/1942 | Paradis | 240—47 |
| 2,677,909 | 5/1954 | Heydenryk | 40—152.2 |
| 3,375,366 | 3/1968 | Scheppe | 240—47 |
| 2,995,981 | 8/1961 | Tamarin. | |

EUGENE R. CAPOZIO, Primary Examiner

RICHARD CARTER, Assistant Examiner

U.S. Cl. X.R.

40—130